Figure 1:
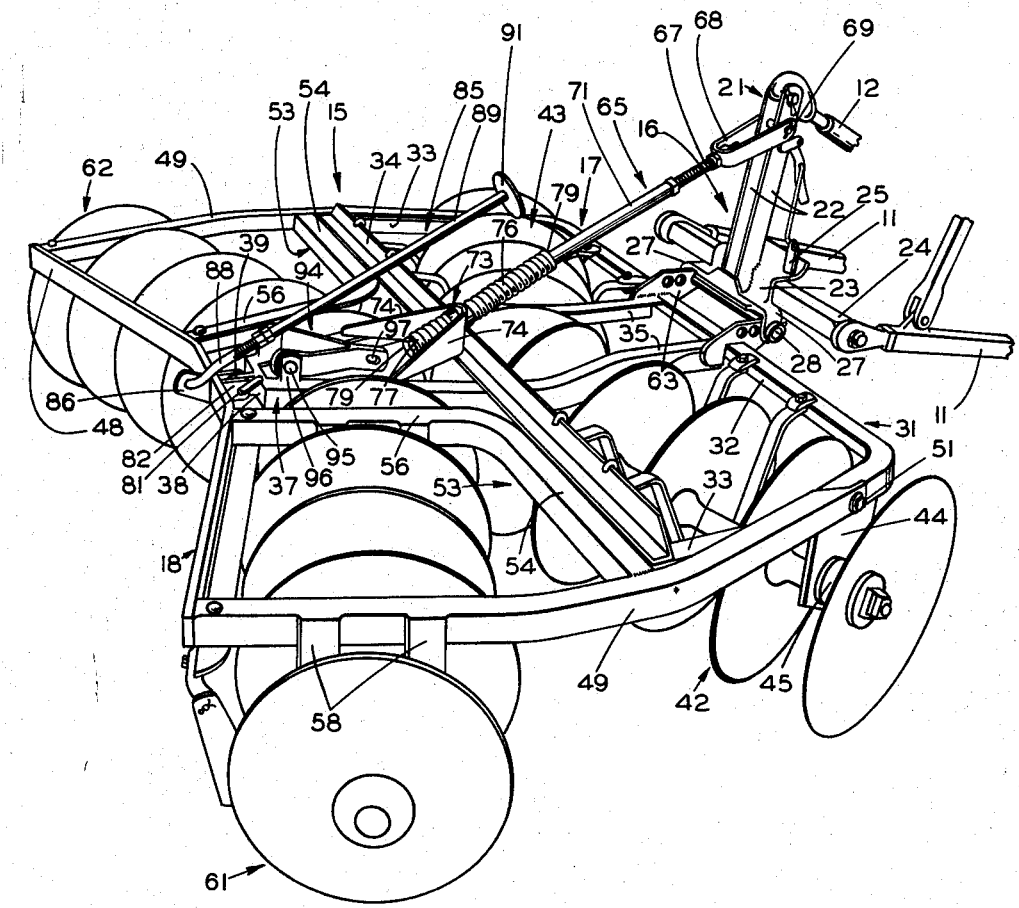

Oct. 11, 1960    W. P. OEHLER ET AL    2,955,664
LIFT TYPE CONVERTIBLE DISK HARROW
Filed Dec. 13, 1956    2 Sheets-Sheet 1

WILLIAM P. OEHLER
CHARLES H. YOUNGBERG    *INVENTORS*

ATTORNEYS

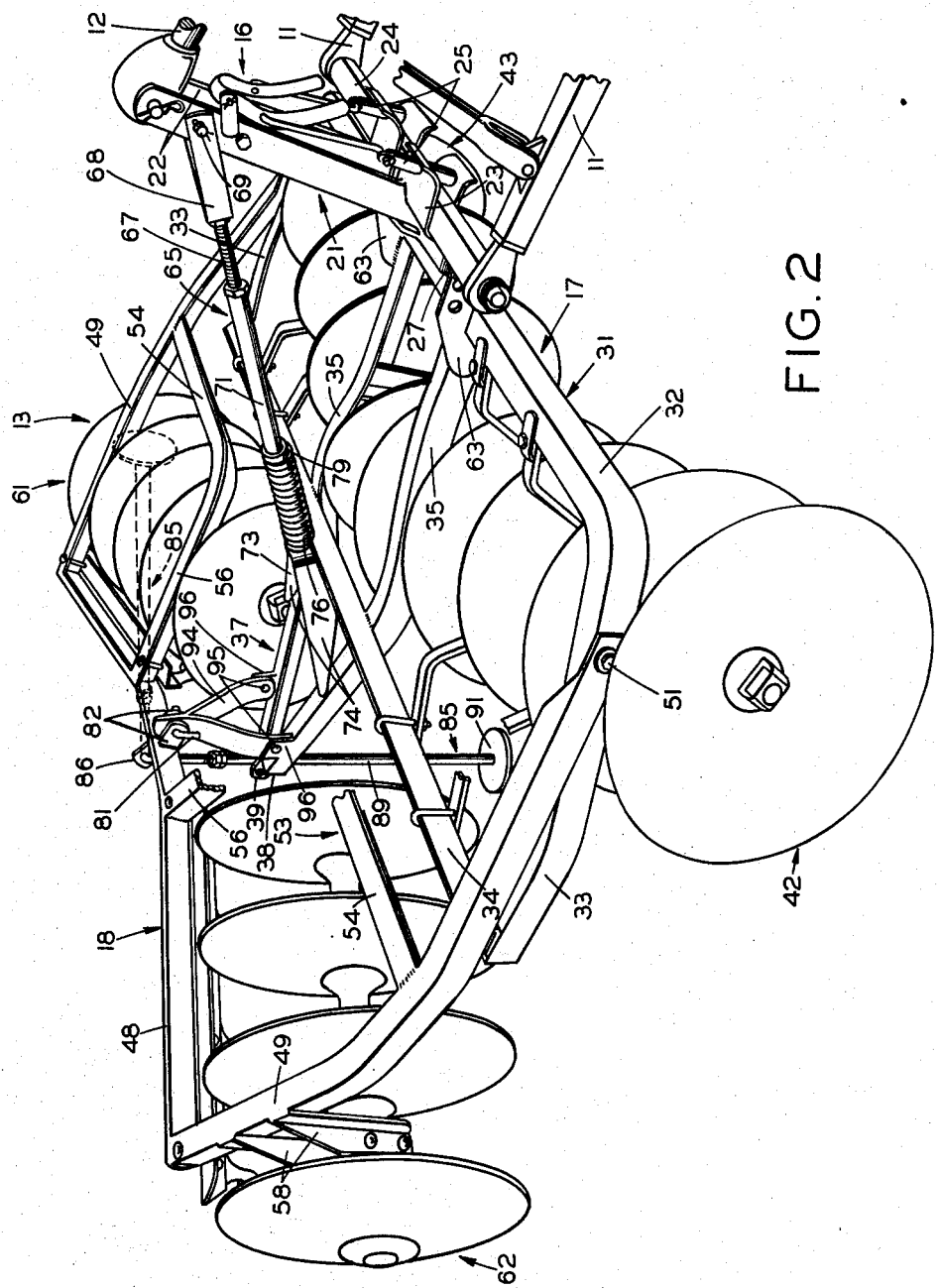

United States Patent Office 2,955,664
Patented Oct. 11, 1960

2,955,664

LIFT TYPE CONVERTIBLE DISK HARROW

William P. Oehler and Charles H. Youngberg, Moline, Ill., assignors, by mesne assignments, to Deere & Company, a corporation of Delaware Filed Dec. 13, 1956, Ser. No. 628,173

13 Claims. (Cl. 172—581)

The present invention relates generally to agricultural implements and more particularly to a pickup or lift type disk harrow.

The object and general nature of the present invention is the provision of a new lift type disk harrow so constructed and arranged as to be easily converted from a single action harrow to a double action harrow, and vice versa, with new and improved means for adding, with increased effectiveness, the weight of the rear gangs to the front gangs so as to increase the effective penetration of the front gangs, especially when operating under difficult soil conditions.

An important feature of this invention is the provision of means movably connecting the front and rear frames so that, as when converting from a double action harrow to a single action harrow, the rear gang may simply be lifted substantially directly upwardly to a position above but in rear of the front gangs, the rear gangs in their raised position being connected with the front gangs in rearwardly overhanging relation, whereby the rear gangs act with increased leverage against the front gangs to insure proper penetration under difficult soil conditions and the like.

Still further, another important feature of this invention is the provision of means making it possible to raise or lower the rear gangs relative to the front gangs by the action of the power lift means of the tractor to which the disk harrow is connected. Specifically, according to the present invention, the disk harrow is connected to the tractor lift means so that by power derived from the tractor the harrow may be raised and lowered relative to the tractor, and ground engaging means is provided so as to act between the rear gangs and the ground, when the harrow is elevated, so that a subsequent lowering of the power lift mechanism permits the front gangs to lower while the rear gangs are held in elevated position by the ground engaging means. Then by interconnecting the front and rear frames while the ground engaging means holds the rear gangs elevated, the rear gangs are thus locked to the front frame so as to remain in elevated position relative thereto. Still further, another feature of this invention is the provision of means locking the front and rear frames in coplanar relationship, as when it is desired to operate the implement as a double action harrow.

These and other objects and advantages of the present invention will be apparent to those skilled in the art after a consideration of the following detailed description, taken in conjunction with the accompanying drawings in which:

Fig. 1 is a perspective view of a harrow constructed according to the principles of the present invention, the implement being shown in working position and arranged as a double action harrow in which the front gangs and the rear gangs are locked in coplanar relation and in operating position.

Fig. 2 is a perspective view of the implement shown in Fig. 1, illustrating the rear gang frame in its raised position, in which the implement operates as a single action harrow, with the weight of the rear gangs added to the front gangs. This figure also shows the action of the ground engaging means in holding the rear gangs in their elevated position while the front gangs are permitted to lower, thus making it easy and convenient to convert the implement from a double action harrow to a single action harrow.

The present invention has been shown by way of illustration as incorporated in a convertible disk harrow that is adapted to be connected with a farm tractor of the type that includes power operated lower draft links 11 and an upper link 12 forming what is commonly referred to as a three-point hitch system that is well known by those skilled in the agricultural implement art.

The disk harrow of the present invention is indicated in its entirety by the reference numeral 13 and comprises a generally vertically disposed hitch frame 16, a forwardly disposed generally transverse front frame 17, and a transverse rear frame 18. The hitch frame 16 includes a mast section 21 that comprises a pair of vertical bars 22 and a lower socket member 23 rigidly secured, as by welding, to the lower ends of the bars 22. The socket member 23 detachably receives a cross bar 24 that, so far as the present invention is concerned, may be considered as forming a part of the draft link structure 11, 11. Suitable means, such as a pair of latches 25, only one of which appears in Fig. 1, detachably connects the draft bar 22 with the socket member 23. The latter member includes a pair of depending portions 27 that are apertured to receive a cross pin 28 that pivotally connects the forward central portion of the front frame 17 to the generally vertical hitch frame 16.

The front frame 17 includes a generally U-shaped angle member 31 having a forward transverse section 32 and, preferably integral therewith, a pair of rearwardly extending side sections 33 to which a rearwardly disposed cross angle 34 is connected in any suitable way, as by welding the ends of the rear cross bar 34 to the rear ends of the side sections 33. This forms a rigid frame arrangement, and in order to further strengthen the front frame, a pair of generally fore and aft extending angles 35 are fixed at their forward ends to the center portion of the front frame section 31 and at their intermediate portions to the generally central portions of the rear cross bar 34. The rear ends of the angles 35 extend rearwardly beyond the cross bar 34 and form a rear extension 37 to which reference will be made below. The rearmost ends of the bars 35 are interconnected by a cross bar 38 that carries an apertured lug 39 to which specific reference will also be made below. Right and left hand gangs 42 and 43 are carried by the front frame 17, being provided with the usual bearing and standard construction, the details of which are of no particular concern here. The right hand outer bearing standard is shown, for example, at 44, which receives the outer end of the associated disk gang 42. Bearing means 45 journals the gang in the bearing bracket 44. The inner end of the disk gang 42 is connected with the central bar 35 by similar means, and likewise similar means is employed for connecting the left hand disk gang 43 with the front frame 17.

The rear frame 18 comprises a generally transversely disposed rear bar 48 and forwardly extending side bars, preferably in the form of suitably spaced angles 49. The forward portions of the side angles 49 of the rear frame extend forwardly alongside and slightly outwardly of the side portions of the front frame 17 and are swingably connected with the latter through suitable pivot means 51. As will be seen in Fig. 1, the rear transverse bar 48 extends slightly to the rear of the rear end of the rear extension 37, and the rear frame 18 includes, in addition to the rear transverse bar 48 and the forwardly extending side bars 49, a pair of generally L-shaped right and left hand angle members, each of which is indicated by the reference numeral 53. Each of these angle members includes a forward laterally outwardly extending section 54, the outer ends of which is welded to the adjacent portion of the forwardly extending frame member 49, and each angle member 53 also includes a rearwardly extending portion 56 that extends generally rearwardly alongside the adjacent rear extension 37 of the front frame 17, the rear ends of the sections 56 being secured, as by welding, to the transverse bar 48. The bar portions 56 and the rear portions of the side angles 49 carry suitable bracket and bearing means, portions of which are indicated by the reference numeral 58 in Fig. 1, by which right and left hand rear disk gangs 61 and 62 are connected with the rear frame 18.

The front frame 17 is provided with right and left hand plates 63 that are welded to the central portion of the front frame, and also to the forward ends of the central angles 35, and the front frame 17 is normally held in proper position relative to the vertical hitch frame 16 by a strut 65 that is connected between the upper end of the hitch frame 16 and the rear portion of the front frame 17. The strut 65 includes a threaded member 67 adjustably connected to a forward yoke 68, the ends of which are pivoted, as at 69, to the upper ends of the mast bars 22. The threaded section 67 is extended into a sleeve or barrel member 71, the rear end of which is slidable relative to a bracket 73 that is made up of a generally V-shaped plate having laterally and rearwardly divergent portions 74 that are welded to the rear front frame angle 34 and to the adjacent portions of the rear extension 37. Cushion springs 76 and 77 are disposed on opposite sides of the central portion of the bracket 73 and are retained between abutments 79 carried by the strut member 71. By virtue of the construction just described, the front frame 17 and associated parts are normally held in proper relation to the mast section of the hitch frame 16.

In the normal position, as when serving as a double action disk harrow, the front and rear frames 17 and 18 are locked together by quick releasable means that includes a pin 81 that extends through aligned apertures in the lug 39 and a pair of cooperating lugs 82 that are welded to the forward side of the transverse rear frame bar 48. Thus, the lugs 82 cooperate with the lug 39 on the rear extension 37 to lock the rear gangs in proper operating position with respect to the front gangs, the front and rear frames being held in substantially coplanar relationship. The disk harrow as a unit may be raised and lowered by operating the tractor power lift means to raise and lower the draft links 11.

In a number of instances, as when operating under difficult soil conditions, as, for example, where the ground is exceptionally hard, it may be desirable to utilize only the front gangs 42 and 43 and to raise the rear gangs 61 and 62 out of ground working position. At the same time, in order to assure proper penetration under difficult conditions, it may also be desirable to add weight to the front gangs so as to increase the penetration of the front disks. According to the present invention, we accomplish both of these objects by, first, merely raising the rear frame 18 and associated disk gangs generally directly upwardly, as by swinging the frame 18 about the axis defined by the pivots 51, and, second, then adding the weight of the rear frame and rear gangs to the front gangs to insure proper penetration. According to the present invention, the shifting of the rear units into a raised position relative to the front units is accomplished without manual exertion and, in effect, utilizes the tractor power lift system to effect a conversion of the implement from a double action harrow into a single action harrow, in which the rear gangs 61 and 62 are held out of ground engaging position.

To this end, we provide, first, a ground engaging strut 85 that is pivoted to a rearwardly extending lug 86 carried by the rear transverse bar 48. The strut 85 includes two relatively adjustable parts, one including a threaded rod-like member 88 and the other a sleeve member 89 carrying at its lower end a ground engaging part 91. Normally, when the harrow is operating as a double action harrow, the strut 85 is swung over into an inoperative position, being supported by the lug 86 and by the adjacent portion of the cross bar 48 which the strut member 89 bears against when the strut 85 is held out of ground engaging position.

In order to utilize the power lift system of the tractor to effect a raising of the rear units relative to the front units, it is necessary only to remove the pin 81 (Fig. 1), actuate the tractor power lift mechanism, including the liftable links 11, so as to raise the entire implement, and then swing the strut 85 over rearwardly and downwardly so that the foot portion 91 engages the ground. It will be seen from Fig. 1 that the horizontal downwardly inwardly extending flanges of the side angles 49 engage the adjacent portions of the front frame 17 so that, even though the pin 81 is removed, the rear frame 18 and associated parts are lifted when the front frame 17 is raised. After the strut 85 has been lowered into ground engaging position, the tractor power lift mechanism is then actuated to lower the harrow but, since the rear frame 18 is held up in a raised position by the strut 85, only the front frame 17 and the rear extension 37 lowers, as shown in Fig. 2. Therefore, when the front gangs rest on the ground, the rear frame and rear gangs are held off the ground by the strut, and the rear end of the rear extension 37 occupies a position well below the lug 82. In order to lock the front and rear frames in this position, a locking arm or strut member 94 is provided. This member comprises a generally V-shaped part having its leg sections pivotally connected, as at 95, to a pair of lugs 96 that are fixed, as by welding, to the rear end of the rear extension 37. The outer end of the V-shaped strut 94 is provided with a slot 97 that is adapted to register with the openings in the lugs 82 on the front side of the rear frame bar 48. While the strut 85 holds the rear units raised, the rear frame is effectively locked in raised position relative to the front frame by reinserting the retaining pin 81 in the aligned openings in the locking arm 94 and the lugs 82. Then by momentarily raising the implement, the weight on the strut 85 can be relaxed and the member 85 swung back into its inoperative position so that the harrow may now be operated with only the front gangs 42 and 43 in ground working position. The strut 94 effectively holds the rear frame 18 and associated parts in elevated position relative to the front gangs 42 and 43 so that the weight of the rear gangs of the parts is added to the front gangs. Moreover, since the rear gangs occupy a position not only above but also rearwardly of the front frame, the weight of the rear units acts with increased leverage against the front gangs to secure and maintain proper penetration. This increased leverage is due to the fact that, in the raised position, the rear gangs 61 and 62 and associated parts are disposed farther rearwardly from the virtual hitch point of the implement with the tractor, which lies adjacent the point of convergence of the links 11 and 12 of the tractor, than the front gangs, and hence the rear gangs have a greater effect, so far as increasing the weight on the front gangs is concerned, than they would have if, for example, the rear gangs were folded forwardly to points directly above the front gangs.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a lift type disk harrow convertible from a single action harrow to a double action harrow, and vice versa, the improvement comprising a forward frame, a rear frame having a forward extension at each side and each extension being rigid relative to said rear frame, means pivotally connecting the forward ends of said extensions to the forward portion of the forward frame to accommodate upward movement of said rear frame relative to the forward frame about a transverse axis defined by said pivoted connecting means and lying adjacent the forward portion of said forward frame, means forming a rear extension rigid with the forward frame and extending rearwardly substantially to the rear portion of the rear frame, and means connected between the rear portion of said rear extension and the rear portion of the rear frame for holding the rear frame out of operation but disposed generally rearwardly of the forward frame.

2. In a lift type disk harrow convertible from a single action harrow to a double action harrow, and vice versa, the improvement comprising a forward frame, a rear frame having a forward extension at each side and each extension being rigid relative to said rear frame, means pivotally connecting the forward ends of said extensions to the forward portion of the forward frame to accommodate upward movement of said rear frame relative to the forward frame about a transverse axis defined by said pivoted connecting means and lying adjacent the forward portion of said forward frame, and means connected between the rear portions of said frames for holding the rear frame out of operation, said forward frame having a rigid extension extending rearwardly substantially to the rear portion of the rear frame, and a substantially vertical strut means connected between the rear end of said rear extension and the rear portion of said rear frame to hold the rear frame in a raised position relative to the forward frame.

3. In a lift type disk harrow adapted to be connected to a tractor having power operated draft links, the improvement comprising a hitch frame adapted to be connected with said draft links and movable generally vertically with the latter, a front frame having disk gang means and connected with said hitch frame, a rear frame connected to be raised and lowered relative to the front frame, a ground engaging strut connected with the rear frame and shiftable into a position suspended generally vertically downwardly from said rear frame and adapted to engage the ground while the gangs are raised, said strut having a length such that the strut engages the ground when the front and rear frames are raised, whereby said rear frame is lifted above the front frame by said strut when said draft links and the front frame are lowered, and means separate from said strut for locking the rear frame in elevated position relative to the front frame, said means including parts disposed in a position to be interconnected when the draft links and front frame are lowered with the strut in ground-engaging position.

4. In a disk harrow of the convertible lift type, adapted to be hitched to a tractor having power lift means, the improvement that comprises a front frame disposable generally transversely and having a rear centrally disposed extension rigid with said front frame, a rear frame also disposable generally transversely and having at each side forwardly extending arms, means pivotally connecting the forward ends of said arms to the side portions of said front frame adjacent the forward portion thereof, means connectible between the rear portion of said extension and the rear portion of said rear frame for holding the latter in substantially coplanar relationship relative to the front frame, apertured lug means on said rear frame, releasable connecting means, and a strut member connected adjacent one end with said rear extension and having an aperture adjacent the other end adapted to be brought into alignment with the apertured lug means on the rear frame, when the latter has been moved into a raised position relative to said front frame, so as to receive said releasable connecting means, whereby the latter acts with said strut member to hold said rear frame in a raised position relative to said other frame.

5. In a convertible disk harrow, a pair of frames one movable generally vertically relative to the other, a part on each of said pair of frames, one of said parts being disposed substantially directly above the other part, a generally vertical strut pivoted to one of said frame parts and swingable into a position adjacent the other frame part, and means carried by the other frame part to interlock with said strut so as to hold said one frame in a raised position relative to said other frame.

6. In a convertible disk harrow, a pair of frames one movable generally vertically relative to the other, means connected with said one frame to raise the latter relative to the other frame, said one frame including a portion substantially overlying an adjacent portion of said other frame, said portions being generally vertically movable one relative to the other, a strut pivoted to the lower frame portion and having an apertured end swingable generally vertically into a generally raised position, an apertured lug carried by the upper frame portion in a position thereon so that when said one frame is raised relative to said other frame the apertures in said lug and strut are adapted to be brought into alignment, and releasable connecting means disposable in said aligned apertures for locking said one frame in a raised position.

7. In a convertible disk harrow, a generally transverse front frame carrying a pair of disk gangs and having a generally centrally disposed rear extension, a rear frame comprising a generally transverse rear bar, side bars fixed, respectively, at their rear ends to the ends of said rear bar and extending alongside the side portions of said front frame, and a pair of generally L-shaped bars, each disposed with one leg fixed at its laterally outer end to the associated side bar and extending laterally inwardly immediately in rear of the adjacent rear portion of said front frame, the other leg of each L-shaped frame bar extending generally rearwardly alongside and laterally outwardly of said front frame rear extension and fixed at its rear end to the generally central portion of said transverse bar, there being a space between said other legs of said L-shaped bars receiving the rear extension of said front frame and the transverse bar of the rear frame being disposed adjacent but rearwardly of the rear end of said rear extension of the front frame, means pivotally connecting the forward ends of said side bars to the generally forward portion of said front frame, and means connecting the central portion of the rear transverse bar and the rear end of said front frame extension for holding said frames against relative movement.

8. In a convertible disk harrow, a generally transverse front frame having a forward transverse section, a rear transverse section, a pair of side sections interconnecting said front and rear sections, and a pair of center members connected with said front and rear sections and extending rearwardly of said rear transverse section to form a rear centrally disposed extension, a pair of front gangs carried by said side sections and the forward portions of said center members, a rear frame comprising a generally transverse rear bar, side bars fixed, respectively, at their rear ends to the ends of said rear bar and extending alongside the side portions of said front frame, and a pair of right and left hand frame members, each disposed with one leg fixed at its laterally outer end to the associated side bar and extending laterally inwardly immediately in rear of the adjacent rear portion of said front frame, the other leg of each frame member extending generally rearwardly alongside and laterally outwardly of said front frame rear extension and fixed at its rear end to the generally central portion of said rear transverse bar, a pair of rear gangs carried by said other legs of said frame members and the side bars of said rear frame, and means pivotally connecting the forward ends of said side bars to the generally forward portion of said front frame, and means connected between the central part of said rear transverse bar and the rear portion of said rear extension for locking the rear frame to the front frame.

9. The invention set forth in claim 8, further characterized by said last mentioned means including a generally vertical strut connectible between said rear transverse bar and the rear portion of said rear extension for holding the rear frame in elevated position relative to the front frame.

10. The invention set forth in claim 8, further characterized by said last mentioned means including a generally vertical strut pivoted to the rear portion of said rear extension and means forming pin-receiving alignable apertured portions, and a locking pin insertable in said apertured positions when aligned for holding the rear frame in elevated position relative to the front frame.

11. The invention set forth in claim 10, further characterized by a stand operatively connected with said rear frame and swingable into a depending ground engaging position, said stand having a length such that, when the harrow is on substantially level ground and the stand is in its ground engaging position, the stand will hold the rear frame in a position to bring said alignable apertured portions into alignment.

12. In a disk harrow of the convertible lift type, adapted to be hitched to a tractor having power lift means, the improvement that comprises a front frame disposable generally transversely and having a rear centrally disposed extension rigid with said front frame, a rear frame also disposable generally transversely and having at each side forwardly extending arms rigid with the rear frame, means pivotally connecting the forward ends of said arms to the side portions of said front frame adjacent the forward portion thereof, means connecting said power lift means with said front frame, means on said arms overlying adjacent portions of said front frame whereby operation of said lift means to raise said front frame will also raise the rear frame, means connected with the rear frame and engageable with the ground to raise the rear frame relative to the front frame when the latter is lowered toward the ground, and means connectible between the rear portion of said extension and the rear portion of said rear frame for holding the latter in the raised position relative to the front frame to which said ground engaging means brings the rear frame when the front frame is lowered.

13. In a disk harrow of the convertible lift type, adapted to be hitched to a tractor having power lift means, the improvement that comprises a front frame disposable generally transversely and connected to be raised and lowered by said power lift means, a rear frame also disposable generally transversely, means pivotally interconnecting said frames whereby the rear frame may be swung upwardly relative to the front frame, apertured means on said frames and adapted to be disposed in alignment when said frames are disposed in generally coplanar relation, ground engaging stand means movably connected with the rear frame and constructed and arranged to raise the rear frame a given distance above the front frame when the latter is lowered to operating position relative to the tractor on level ground, apertured means carried by the front frame in a position to be alined with the apertured means on the rear frame when the latter is raised said given distance, and locking means insertable in said alined apertured means in either the raised position of said rear frame or in the coplanar position of said frames.

References Cited in the file of this patent

UNITED STATES PATENTS

| 872,957 | Mohr | Dec. 3, 1907 |
| 1,147,281 | Trissel | July 20, 1915 |
| 2,613,491 | Evans et al. | Oct. 14, 1952 |
| 2,640,307 | Robertson | July 28, 1953 |
| 2,774,206 | Lynch | Dec. 18, 1956 |
| 2,784,656 | Sheppard | Mar. 12, 1957 |
| 2,784,658 | Hodges | Mar. 12, 1957 |

FOREIGN PATENTS

| 570,933 | France | Jan. 23, 1924 |